United States Patent [19]
Makwinski et al.

[11] 3,770,457
[45] Nov. 6, 1973

[54] METHOD OF MAKING PELLETIZED COFFEE PERCOLATOR PACKAGE

[75] Inventors: John A. Makwinski, Garfield; Warren C. Rehman; Clifford H. Spotholz, both of Montvale, all of N.J.

[73] Assignee: General Foods Corporation, White Plains, N.Y.

[22] Filed: Apr. 19, 1972

[21] Appl. No.: 245,395

[52] U.S. Cl. ................................. 426/394, 99/77.1
[51] Int. Cl. .......................... A23f 1/00, B65b 29/02
[58] Field of Search ............................... 99/66, 77.1

[56] References Cited
UNITED STATES PATENTS
3,511,666  5/1970  Hudson et al. ...................... 99/77.1
3,607,299  9/1971  Bolt ..................................... 99/77.1

FOREIGN PATENTS OR APPLICATIONS
808,588  3/1969  Canada ................................. 99/66

*Primary Examiner*—Frank W. Lutter
*Assistant Examiner*—William L. Mentlik
*Attorney*—Thomas R. Savoie et al.

[57] ABSTRACT

Roasted and ground coffee is degassed, then heated to a temperature of from 90° F to about 110° F prior to being compressed to form a pellet which is then packaged in a porous filter material. The resulting package has an improved availability of soluble solids over comparable products prepared from unheated roasted and ground coffee.

5 Claims, No Drawings

METHOD OF MAKING PELLETIZED COFFEE PERCOLATOR PACKAGE

BACKGROUND OF THE INVENTION

Pelletized coffee percolator packages such as described in commonly-assigned U.S. Pat. No. 3,511,666, hereby incorporated by reference, have recently become available to the consumer. Generally these products are compressed to doughnut shaped tablets of roasted and ground coffee which are wrapped or packaged in porous filter paper material. The covered pellets are adapted to fit into the basket of conventional home percolators and have the advantages of reducing sediment in the brewed beverage and also provide a neat and efficient way in which to dispose of the spent coffee grounds.

These coffee pellets are formed under substantial pressure so that a self-sustaining pellet capable of being wrapped or packaged is produced while at the same time the pressing operation is sufficient or effective to release at least 10 percent more extractable solids than would be obtained from an equivalent charge of fresh R & G coffee, but insufficient to disrupt the coffee particles to the extent that coffee lipids are expressed which would introduce an undesirable oil film or slick in the percolator brew. Generally it has been found that the amount of pressure applied to the coffee should be kept under 16,000 p.s.i. and preferably under about 13,000 p.s.i. As disclosed in the referenced U. S. Pat. No. 3,511,666, the amount of pressure applied must be between 8,000 to 16,000 p.s.i.

It has, however, been found that compressing at below the above pressure limits for a period of time insufficient to release substantial coffee lipids does not always assure the production of a coffee pellet which will, when enclosed in suitable filter material, produce a desirable amount of coffee solids in the brewed beverage within the usual percolation period of about 7 minutes.

SUMMARY OF THE INVENTION

It has now been discovered that an improved extraction of soluble solids can be obtained from pelletized coffee brewing packages if the temperature of the roasted, ground and degassed coffee is increased to a temperature of between 90° F and about 110° F at the time of pelletizing. It has additionally been found that moisturizing the coffee prior to heating and pelletizing further improves the extraction of soluble solids. These improvements assure that the pelletized coffee brewing packages made in accordance with this invention will produce a level of soluble solid in the brewed beverage in excess of 1.15 percent by weight within a conventional home brewing cycle.

DESCRIPTION OF THE INVENTION

Freshly roasted and ground coffee is degassed to the extent that less than 600 cc. and preferably less than 480 cc. of releaseable gas is present per pound of coffee. This degassing prior to pelletizing is necessary to prevent fissures from occurring in the pellet which might thereby make the pellet unsuitable for wrapping or packaging. Degassing to the required extent may be accomplished by aging the coffee at room temperature for at least about 3 hours and normally for about 12 to 18 hours after grinding. This will release all but about 500 cc./lb. of releaseable gas, mostly $CO_2$, and assure production of a fissure free pellet. During this degassing operation, the coffee which may initially be warm as a result of roasting and grinding cools to below 90° F and usually cools to at least between 75° and 80° F.

The roasted coffee may be ground in the conventional manner with conventional particle size distributions being preferred. A suitable distribution is one wherein about 85 percent of the coffee particles are between 12 and 30.U.S. Standard mesh and about 15 percent are less than 30 mesh. In this "Regular Grind" distribution some of the particles of coffee are smaller than 0.01 inch in diameter and if not pelletized would freely pass through the openings of filter material capable of providing good extraction rates of soluble solids, since such material should have holes greater than 0.01 inch in diameter.

According to this invention the roasted, ground and degassed coffee is heated so that it attains an equilibrium temperature of from 90° F to about 110° F. The use of coffee temperatures below 90° F does not assure the production of conventionally brewed beverages having a solids content of at least 1.15 percent by weight. Preferably the coffee temperature should be 100° F or higher in order to obtain tablets which will produce conventionally brewed beverages having a solids content averaging at least 1.20 percent by weight. At temperatures above 110° F the desirably high level of solids is still obtained; however, the coffee flavor and aroma tends to deteriorate and it has also been found that the structural stability or crush strength of the tablet is reduced, probably due to the rapid evolution of the remaining gases from the coffee at this elevated temperature.

It has additionally been found that it is desirable in order to further assure the production of the desired solids content in the brewed beverage that the moisture content of the roasted, ground, degassed and heated coffee be at a level of about 4.2 to 4.8 percent by weight, immediately prior to compression. A moisture content below about 4.2 percent has been found to result in a soluble solids level in the brewed beverage of below an average value of 1.20 percent. A moisture content above 4.8 percent by weight has been found to produce tablets having a reduced and unsatisfactory crush strength. It has also been found that a moisture content in excess of 4.8 percent tends to produce accelerated loss of freshness of the coffee even when vacuum packed in a metal can.

The amount of moisture present in the coffee immediately prior to compression is primarily a function of the conditions at which the coffee is roasted, the manner in which the roasted coffee is quenched and the manner in which the roasted, ground and degassed coffee is heated to the desired temperature of between 90° F and about 110° F. Regulation of these, as well as other, factors to obtain coffee within the defined limits of temperature and moisture content set forth in this invention is seen to be well within the skill of the coffee art.

Preferably the moisture content is adjusted while water quenching whole coffee after roasting. This allows adequate time for equalization of moisture during degassing and prior to pressing. Alternatively the coffee can be contacted before, during or after the heating step with steam, water, moist gas or other known means to adjust the moisture content. It is preferred, however, to adjust the moisture content of the coffee sufficiently before pressing to allow equilibration of the coffee's water content.

According to a preferred embodiment of this invention the freshly roasted and ground coffee is degassed by holding the coffee in storage bins at room temperature for a period of about 12 to 18 hours, during which time the coffee evolves gas and cools to a temperature below 90° F, usually 75° to 80° F. Subsequent to this degassing operation the coffee is conveyed or transported to the tabletting apparatus while being subjected to a heating operation. Such means as a heated screw conveyor or a heated fluidized bed conveyor have proven useful for this purpose. Heating the coffee while it is not in a static condition permits a more rapid and even application of heat to the coffee material and avoids the necessity of a prolonged and possibly deleterious heating step such as would be necessary if the coffee were to be heated to a equilibrium temperature of from 90° F to about 110° F while being held in a static condition such as in a storage bin. It has also been found that better control over and a more uniform moisture content can be accomplished by this manner of heating.

Preferably the heated coffee is immediately fed to the pelletizing apparatus with little or no hold-up time. In this manner the coffee is not subjected to elevated temperature conditions for a prolonged period of time.

The pelletizing apparatus is designed to receive a charge of the roasted, ground, degassed and heated coffee and to compress the charge into a self-sustaining pellet, which is capable of releasing 10 percent more extractable solids. As previously indicated the apparatus exerts a pressure, preferably below about 13,000 p.s.i., for a period of time which avoids expressing coffee lipids from the coffee which would introduce an undesirable oil film or slick in the percolator brew. The pellet may be made in the form of a doughnut-shaped tablet, wafer or other desired shape, the doughnut shape being preferred for obvious reasons. The compression step can be accomplished by several chemical engineering apparatuses known to the art as illustrated by U.S. Pat. Nos. 3,511,666 and 3,607,299. No criticality exists in regard to the wrapping or packaging step this being known to the art by the two above-mentioned patents which also disclose suitable water-permeable or porous filter material for use in this invention.

This invention is further described but not limited by the following example.

EXAMPLE

Doughnut-shaped coffee tablets were made from fresh roasted ground and degassed coffee (50/18/32) by tabletting the coffee at the rate of 400 tablets per minute in Stokes (Model 340) 15 station, dual feed, rotary press operating at a pressure of about 11,000 p.s.i.g. The tablets were then wrapped in a non-woven fabric in accordance with Example 2 of U.S. Pat. No. 3,511,666. The temperature and moisture content of the coffee immediately prior to compression was varied according to the table below. The thus formed brewing package were evaluated for solids extraction by identically brewing the package in an electric home percolator. The results are given in the table below, each soluble solids reading being the average of at least 5 separate brewing operations.

| % H$_2$O | Tabletting Temp. (°F) | Soluble Solids (% weight) |
| --- | --- | --- |
| 3.7 | 75–80 | 0.95 |
| 4.3 | 75–80 | 1.08 |
| 4.3 | 100–110 | 1.22 |
| 4.6 | 75–80 | 1.06 |
| 4.6 | 85–95 | 1.15 |
| 4.6 | 100–110 | 1.21 |

Having thus described the invention what is claimed is:

1. A process for making a percolator package for use brewing coffee which comprises
   a. degassing freshly roasted and ground coffee by holding the coffee at ambient conditions for at least 3 hours whereby less than 600 cc/lb of releasable gas remains present in the coffee, and during which degassing period the coffee cools to below 90° F,
   b. heating the degassed coffee to achieve an equilibrium temperature of from between 90° F to about 110° F,
   c. compressing the heated coffee at a pressure between 8,000 to 16,000 p.s.i. for a sufficient period of time to form a self-sustaining pellet and to release at least 10 percent more extractable solids than an equivalent charge of coffee not compressed but insufficient to express coffee lipids which would introduce an undesirable oil film or slick in the percolator brew, and
   d. enclosing the pellet in a porous filter material.

2. The process of claim 1 wherein the moisture content of the heated coffee prior to compression is 4.2 to 4.8 percent by weight.

3. The process of claim 1 wherein the degassed coffee is heated to a temperature of from 90° F to about 110° F while it is being conveyed to the pelletizing apparatus.

4. The process of claim 3 wherein the coffee temperature is between 100° and 110° F.

5. The process of claim 1 wherein the coffee cools to at least between 75° to 80° F.

* * * * *